US012751437B2

(12) United States Patent
Kawamura

(10) Patent No.: US 12,751,437 B2
(45) **Date of Patent: *Oct. 6, 2026**

(54) INTEGRALLY MOLDED REEL SEAT AND GRIP HANDLE FOR FISHING ROD

(71) Applicant: GLOBERIDE, Inc., Tokyo (JP)

(72) Inventor: Takuji Kawamura, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 44 days.

This patent is subject to a terminal disclaimer.

(21) Appl. No.: 18/033,551

(22) PCT Filed: Sep. 14, 2021

(86) PCT No.: PCT/JP2021/033643

§ 371 (c)(1),
(2) Date: Apr. 24, 2023

(87) PCT Pub. No.: WO2022/091611

PCT Pub. Date: May 5, 2022

(65) Prior Publication Data

US 2023/0363367 A1 Nov. 16, 2023

(30) Foreign Application Priority Data

Oct. 30, 2020 (JP) ................................. 2020-183348

(51) Int. Cl.
*A01K 87/08* (2006.01)
*A01K 87/06* (2006.01)

(52) U.S. Cl.
CPC .............. *A01K 87/08* (2013.01); *A01K 87/06* (2013.01)

(58) Field of Classification Search
CPC ................................ A01K 87/08; A01K 87/06
See application file for complete search history.

(56) References Cited

U.S. PATENT DOCUMENTS 2,145,612 A * 1/1939 Scogland ............... A01K 87/06 43/22
2,780,883 A 2/1957 Macy
(Continued)

FOREIGN PATENT DOCUMENTS

CN 1385066 A 12/2002
CN 1606910 A 4/2005
(Continued)

OTHER PUBLICATIONS

International Preliminary Report on Patentability for related International Application No. PCT/JP2021/033643; action dated May 2, 2023; (7 pages).

(Continued)

*Primary Examiner* — Jessica B Wong
(74) *Attorney, Agent, or Firm* — Oliff PLC

(57) ABSTRACT

There is provided a fishing rod reel seat, a fishing rod handle member comprising the reel seat, and a fishing rod comprising the fishing rod reel seat and the fishing rod handle member, in which the inner surface processability is high, and the absence of resin and the fiber fuzz on an inner surface are less likely to occur. According to an embodiment of the present disclosure, there is provided a fishing rod handle member made by integrally molding a reel seat main body having a reel leg placing portion on which a reel leg is placed and a grip connected to the reel seat main body, in which an outer layer of the fishing rod handle member is formed of carbon fiber reinforced plastic and an inner layer of the fishing rod handle member is formed of resin.

4 Claims, 8 Drawing Sheets

(56) References Cited

U.S. PATENT DOCUMENTS

| | | | | | |
|---|---|---|---|---|---|
| 2,814,147 | A | * | 11/1957 | Miller | A01K 87/06 43/22 |
| 4,222,192 | A | * | 9/1980 | Jacobson | A01K 87/08 43/22 |
| 4,403,439 | A | * | 9/1983 | Wallace | A01K 87/08 43/18.5 |
| 4,520,587 | A | * | 6/1985 | Wallace | A01K 87/06 43/18.5 |
| 4,750,287 | A | * | 6/1988 | Myers | A01K 87/007 43/18.1 R |
| 4,885,865 | A | * | 12/1989 | Rumbaugh | A01K 87/00 43/18.5 |
| 4,920,682 | A | | 5/1990 | Andreasen et al. | |
| 5,115,591 | A | * | 5/1992 | Oyama | A01K 87/08 43/22 |
| 5,638,870 | A | | 6/1997 | Takada et al. | |
| 5,875,581 | A | | 3/1999 | Yasui | |
| 6,029,389 | A | * | 2/2000 | Newton | B25G 1/102 43/21.2 |
| 6,105,302 | A | * | 8/2000 | Yamamoto | A01K 87/08 43/23 |
| 6,286,244 | B1 | * | 9/2001 | Weiss | A01K 87/04 43/18.1 R |
| 6,339,896 | B1 | | 1/2002 | Akiba | |
| 6,973,750 | B1 | | 12/2005 | Kim | |
| 11,266,137 | B1 | | 3/2022 | Miller | |
| 2002/0017050 | A1 | * | 2/2002 | Irrgang | A01K 87/08 43/18.1 R |
| 2005/0055865 | A1 | | 3/2005 | Markley et al. | |
| 2007/0193105 | A1 | * | 8/2007 | Miller | A01K 87/08 43/18.1 R |
| 2009/0013584 | A1 | * | 1/2009 | Selfors | A01K 87/08 43/18.1 R |
| 2013/0255131 | A1 | | 10/2013 | Abbey et al. | |
| 2014/0173967 | A1 | * | 6/2014 | Iwata | A01K 87/08 43/18.1 R |
| 2015/0181851 | A1 | | 7/2015 | Akiba et al. | |
| 2016/0044903 | A1 | * | 2/2016 | Grahl | A01K 87/06 43/23 |
| 2017/0280695 | A1 | * | 10/2017 | Kawamura | A01K 87/08 |
| 2018/0020649 | A1 | * | 1/2018 | Kotarsky | A01K 87/08 43/23 |
| 2019/0166816 | A1 | * | 6/2019 | Iwata | A01K 87/08 |
| 2020/0352149 | A1 | * | 11/2020 | Iwata | A01K 87/02 |
| 2021/0259228 | A1 | * | 8/2021 | Hutchins, Jr. | B25G 1/06 |
| 2023/0072935 | A1 | * | 3/2023 | Kawamura | A01K 87/06 |
| 2023/0082885 | A1 | * | 3/2023 | Kawamura | A01K 87/08 43/18.1 R |
| 2023/0309524 | A1 | * | 10/2023 | Kawamura | A01K 87/06 |

FOREIGN PATENT DOCUMENTS

| | | | |
|---|---|---|---|
| CN | 104737996 | A | 7/2015 |
| CN | 106342767 | A | 1/2017 |
| CN | 107439501 | A | 12/2017 |
| JP | 827-000081 | Y | 1/1952 |
| JP | S27-000081 | Y | 1/1952 |
| JP | S513989 | A | 1/1976 |
| JP | S59-110575 | U | 7/1984 |
| JP | 861224921 | A | 10/1986 |
| JP | S61224921 | A | 10/1986 |
| JP | H02-046292 | U | 3/1990 |
| JP | 03129062 | U | 12/1991 |
| JP | H04-049961 | U | 4/1992 |
| JP | H05276854 | A | 10/1993 |
| JP | H07-327557 | A | 12/1995 |
| JP | H10-215734 | | 8/1998 |
| JP | H11137132 | A | 5/1999 |
| JP | 2000-342125 | A | 12/2000 |
| JP | 2013-021923 | A | 2/2013 |
| TW | 550047 | B | 9/2003 |

OTHER PUBLICATIONS

Dec. 12, 2023 Office Action issued in Japanese Patent Application No. 2020-183348.
Jun. 5, 2024 Office Action issued in Australian Patent Application No. 2021372000.
Apr. 23, 2024 Office Action issued in Japanese Patent Application No. 2020-183348.
Examination Report in connection with UK Patent Application No. 2304969.5; action mailed on Sep. 11, 2023; (4 pages).
May 22, 2024 Office Action issued in Chinese Patent Application No. 202180052598.7.
Dec. 7, 2021 International Search Report issued in International Application PCT/JP2021/033643.
Dec. 7, 2021 Written Opinion issued in International Application PCT/JP2021/033643.
Dec. 30, 2024 Office Action issued in Chinese Application No. 202180052598.7.
Mar. 5, 2024 Extended European Search Report issued in European Patent Application No. 20926750.9.
Mar. 6, 2025 Office Action issued in Chinese Application No. 202180052598.7.
Mar. 21, 2025 Notice of Preliminary Rejection issued in Korean Application No. 10-2023-7006489.
1 Sep. 5, 2025 Office Action issued in U.S. Appl. No. 17/912,774.
Mar. 26, 2026 Notice of Allowance issued in U.S. Appl. No. 17/912,774.
Sep. 4, 2025 Office Action issued in Singaporean Patent Application No. 11202302624Y.
Jul. 11, 2024 Office Action issued in U.S. Appl. No. 17/912,774.
Dec. 16, 2024 Office Action issued in Korean Application No. 10-2022-7036965.
Jan. 21, 2025 Final Rejection received in U.S. Appl. No. 17/912,774.
Mar. 9, 2021 International Search Report issued in International Patent Application No. PCT/JP2020/045603.
Mar. 9, 2021 Written Opinion issued in International Patent Application No. PCT/JP2020/045603.
Oct. 19, 2021 Office Action issued in Taiwanese Patent Application No. 110103274.
Jul. 5, 2022 Office Action issued in Taiwanese Patent Application No. 110103274.
Sep. 22, 2022 Preliminary Report on Patentability issued in International Patent Application No. PCT/JP2020/045603.
Dec. 13, 2022 Office Action issued in Japanese Patent Application No. 2020-057576.
Apr. 22, 2023 First Chinese Office Action issued in Chinese Patent Application No. 202080099048.6.
Mar. 26, 2025 Advisory Action issued in U.S. Appl. No. 17/912,774.
International Search Report for related International Application No. PCT/JP2021/033643; Action dated May 5, 2022; (5 pages).
Written Opinion for related International Application No. PCT/JP2021/033643; Action dated May 2, 2022; (3 pages).

* cited by examiner

INTEGRALLY MOLDED REEL SEAT AND GRIP HANDLE FOR FISHING ROD

CROSS-REFERENCE TO RELATED APPLICATIONS

The present application is a National Stage of International Application No. PCT/JP2021/033643 filed on Sep. 14, 2021 which claims priority to and the benefit of Japanese Patent Application No. 2020-183348 filed on Oct. 30, 2020, the contents of which are incorporated herein by reference in their entirety.

FIELD

The present disclosure relates to a fishing rod reel seat, a fishing rod handle member comprising the reel seat, and a fishing rod comprising the fishing rod reel seat and the fishing rod handle member.

BACKGROUND

In the related art, various fishing rods each including a fishing rod reel seat and a grip have been known.

In such a fishing rod, a fishing rod reel seat and a fishing rod grip are usually placed on a rod body, and a reel leg placing portion for placing a reel leg on an upper side or a lower side of a main body is formed on the fishing rod reel seat.

As such a fishing rod, for example, Patent Literature 1 discloses a tubular body for a rod body, which is formed as a fishing rod by being baked in a state of being formed in a predetermined cylindrical body, in which an intermediate layer elastically deformable even after the baking is interposed between a layer body in which reinforcing fibers aligned in a fiber direction and a thermosetting resin are integrally formed and a layer body in which the reinforcing fibers aligned in the fiber direction and the thermosetting resin are integrally formed, and a through hole that allows permeation of part of two layer bodies into the intermediate layer and integrates the two layer bodies is formed.

Furthermore, Patent Literature 2 discloses a tubular body obtained by forming a layer on the outermost surface or innermost surface of a predetermined portion of a prepreg wound around a core metal and baking the layer, the layer being formed by causing a thermosetting resin material of which viscosity decreases when a temperature during baking increases to overlap with a mat-shaped resin material that melts in a temperature range higher than the temperature at which the viscosity of the resin material decreases and in a temperature range lower than the temperature of baking.

CITATION LIST

Patent Literature

Patent Literature 1: JP H04-49961 U
Patent Literature 2: JP H03-129062 U

SUMMARY

However, in the tubular body disclosed in Patent Literature 1, a tubular body for a rod body is formed in which an intermediate layer elastically deformable even after baking is interposed between a layer body in which reinforcing fibers aligned in a fiber direction and a thermosetting resin are integrally formed and a layer body in which the reinforcing fibers aligned in the fiber direction and the thermosetting resin are integrally formed, and a through hole that allows permeation of part of two layer bodies into the intermediate layer and integrates the two layer bodies is formed, but there is a problem that in a molded rod body, the absence of resin and the fiber fuzz and void on an inner surface are likely to occur, the inner surface processability is deteriorated, and it is difficult to perform molding so as to satisfy design target performance.

Furthermore, even in the tubular body disclosed in Patent Literature 2, a tubular body is formed, which is obtained by forming a layer on the outermost surface or innermost surface of a predetermined portion of a prepreg wound around a core metal and baking the layer, the layer being formed by causing a thermosetting resin material of which viscosity decreases when a temperature during baking increases to overlap with a mat-shaped resin material that melts in a temperature range higher than the temperature at which the viscosity of the resin material decreases and in a temperature range lower than the temperature of baking. However, there is a problem that in a molded rod body, the absence of resin and the fiber fuzz and void on an inner surface are likely to occur, the inner surface processability is deteriorated, and it is difficult to perform molding so as to satisfy design target performance.

The present disclosure has been made in view of the above circumstances, and an object of the present disclosure is to provide a fishing rod reel seat, a fishing rod handle member comprising the reel seat, and a fishing rod comprising the fishing rod reel seat and the fishing rod handle member, in which the inner surface processability is high, and the absence of resin and the fiber fuzz on an inner surface are less likely to occur. Purposes of the present disclosure other than this object will be clarified by referring to the overall description disclosed herein.

According to an embodiment of the present disclosure, there is provided a fishing rod handle member made by integrally molding a reel seat main body having a reel leg placing portion on which a reel leg is placed and a grip connected to the reel seat main body, in which an outer layer of the fishing rod handle member is formed of carbon fiber reinforced plastic and an inner layer of the fishing rod handle member is formed of resin.

The fishing rod handle member according to the embodiment of the present disclosure is formed in a hollow shape.

In the fishing rod handle member according to the embodiment of the present disclosure, an end of a rod body for a fishing rod is attached to one end of the reel seat main body on an opposite side of the grip.

In the fishing rod handle member according to the embodiment of the present disclosure, carbon fibers formed of the carbon fiber reinforced plastic are continuously formed in a longitudinal direction of the fishing rod handle member.

According to the embodiment of the present disclosure, there is provided a fishing rod comprising: any one of the fishing rod handle members described above; and a rod body.

According to the embodiment of the present disclosure, there is provided a fishing rod reel seat main body having one end attached to a rod body for a fishing rod and the other end attached to a fishing rod grip, the fishing rod reel seat main body comprising a reel leg placing portion on which a reel leg is placed, the fishing rod reel seat main body being integrally molded with the reel leg placing portion as a whole.

According to the embodiment described above, there can provided the fishing rod reel seat, the fishing rod handle member comprising the reel seat, and the fishing rod comprising the fishing rod reel seat and the fishing rod handle member, in which the inner surface processability is high, and the absence of resin and the fiber fuzz on an inner surface are less likely to occur.

DETAILED DESCRIPTION

Figure 1:
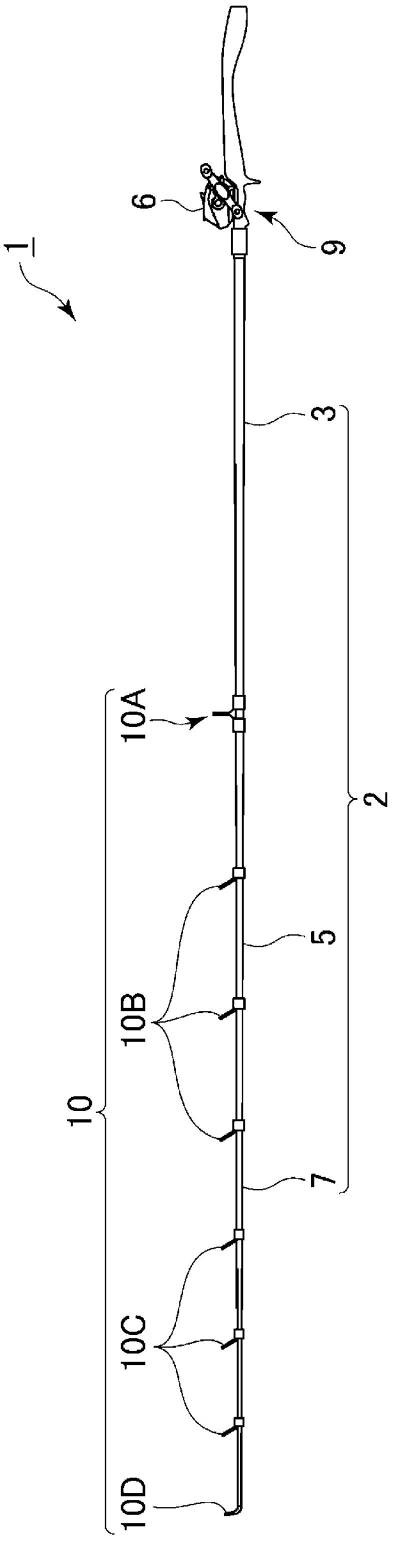
FIG. 1 is a view illustrating a fishing rod according to an embodiment of the present disclosure.

Hereinafter, an embodiment of a fishing rod according to the present disclosure will be specifically described with reference to the accompanying drawings. Components common to a plurality of drawings are denoted by the same reference numerals throughout a plurality of the drawings. Note that the drawings are not necessarily drawn to scale for convenience of description.

FIG. 1 is a view illustrating a fishing rod according to the embodiment of the present disclosure. As illustrated in the drawing, a fishing rod 1 according to the embodiment of the present disclosure comprises a rod body 2, a reel R attached to the rod body 2 via a reel seat 9, and a fishing line guide 10 attached to the rod body 2. In the illustrated embodiment, the reel seat 9 and each of the fishing line guides 10 correspond to attachment components attached to an outer peripheral surface of the rod body.

The rod body 2 is constituted by, for example, connecting a base rod 3, a middle rod 5, a tip rod 7, and the like to each other. These rod bodies are joined to each other, for example, as an ordinarily jointed type. The base rod 3, the middle rod 5, and the tip rod 7 can be joined to each other as a telescopic type, an inversely jointed type, a socket-and-spigot jointed type, or any other known joining type. The rod body 2 may be formed by a single rod body.

The base rod 3, the middle rod 5, and the tip rod 7 are each formed by, for example, a tubular body made of a fiber-reinforced resin. This tubular body made of a fiber-reinforced resin is formed by winding a fiber-reinforced resin prepreg (prepreg sheet) in which reinforcing fibers are impregnated with a matrix resin around a core metal, and heating and curing the prepreg sheet. As the reinforcing fibers contained in the prepreg sheet, for example, carbon fibers, glass fibers, and any other known reinforcing fibers can be used. As the matrix resin contained in the prepreg sheet, a thermosetting resin such as an epoxy resin can be used. After the prepreg sheet is cured, the core metal is removed. Furthermore, an outer surface of the tubular body is appropriately polished. Each of the rod bodies may be formed in a solid state.

In the illustrated embodiment, the base rod 3, the middle rod 5, and the tip rod 7 comprise a plurality of the fishing line guides 10 (fishing line guides 10A to 10D) for guiding a fishing line fed from the reel 6 attached to the reel seat 9. More specifically, the base rod 3 comprises the fishing line guide 10A, the middle rod 5 comprises the fishing line guide 10B, and the tip rod 7 comprises the fishing line guide 10C. The tip rod 7 comprises the top guide 10D at a tip thereof, but details thereof are omitted.

Next, a reel seat main body 12 and the reel seat 9 will be described with reference to FIG. 2. The reel seat 9 comprises the reel seat main body 12 having a reel leg placing surface 12*a* on which a reel leg 6*a* of the fishing reel 6 is placed in an axial direction thereof. The reel seat main body 12 is formed in a cylindrical shape as a whole. The reel seat main body 12 can have a length of 60 mm to 160 mm, for example, but is not limited thereto.

Furthermore, the reel seat main body 12 comprises a grip portion 12*b* that is slightly bulged from the opposite side of the reel leg placing surface 12*a* and has an easy-to-grip curved outer surface that supports a thenar and an area near the thenar when gripped with a gripping hand.

Figure 2:
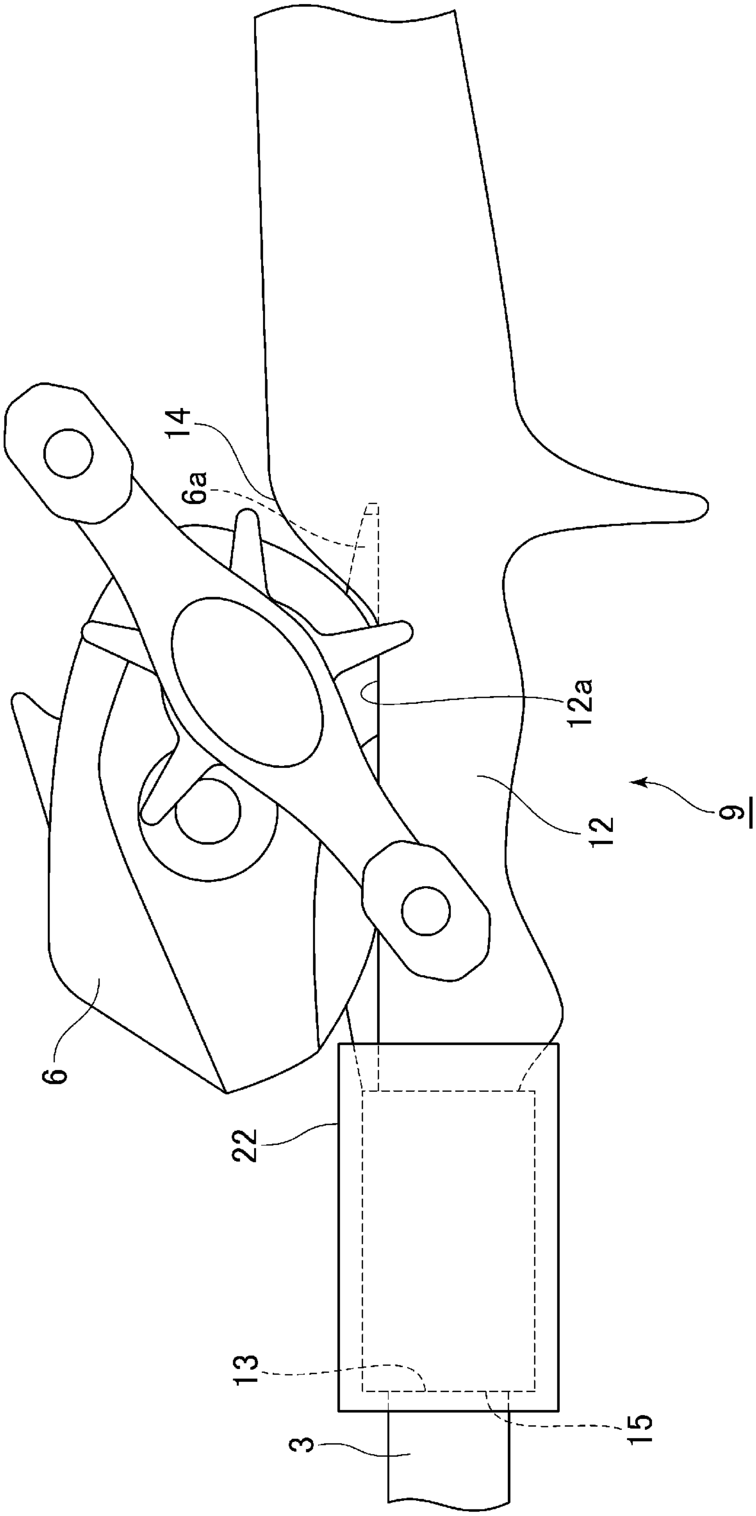
FIG. 2 is a view illustrating a fishing rod reel seat according to the embodiment of the present disclosure.

The reel leg placing surface 12*a* of the reel seat main body 12 can be formed flat or substantially flat with a curvature greater than that of another circumferential portion (for example, the grip portion 12*b*) adjacent to the reel leg placing surface 12*a* of the reel seat main body 12, and is formed so as to extend in an axial direction of the reel seat main body 12 illustrated in FIG. 2. A fixing hood 14 is integrally disposed at one end (rod base side) of the reel seat main body 12. One end of the reel leg placing surface 12*a* of the reel seat main body 12 is disposed inside the fixing hood 14.

A moving hood 22 is attached to the other end (rod tip side) of the reel seat main body 12 so as to be movable in an axial direction. The reel seat main body 12 and the moving hood 22 may be collectively referred to as the reel seat 9, but details thereof are omitted.

Figure 3:
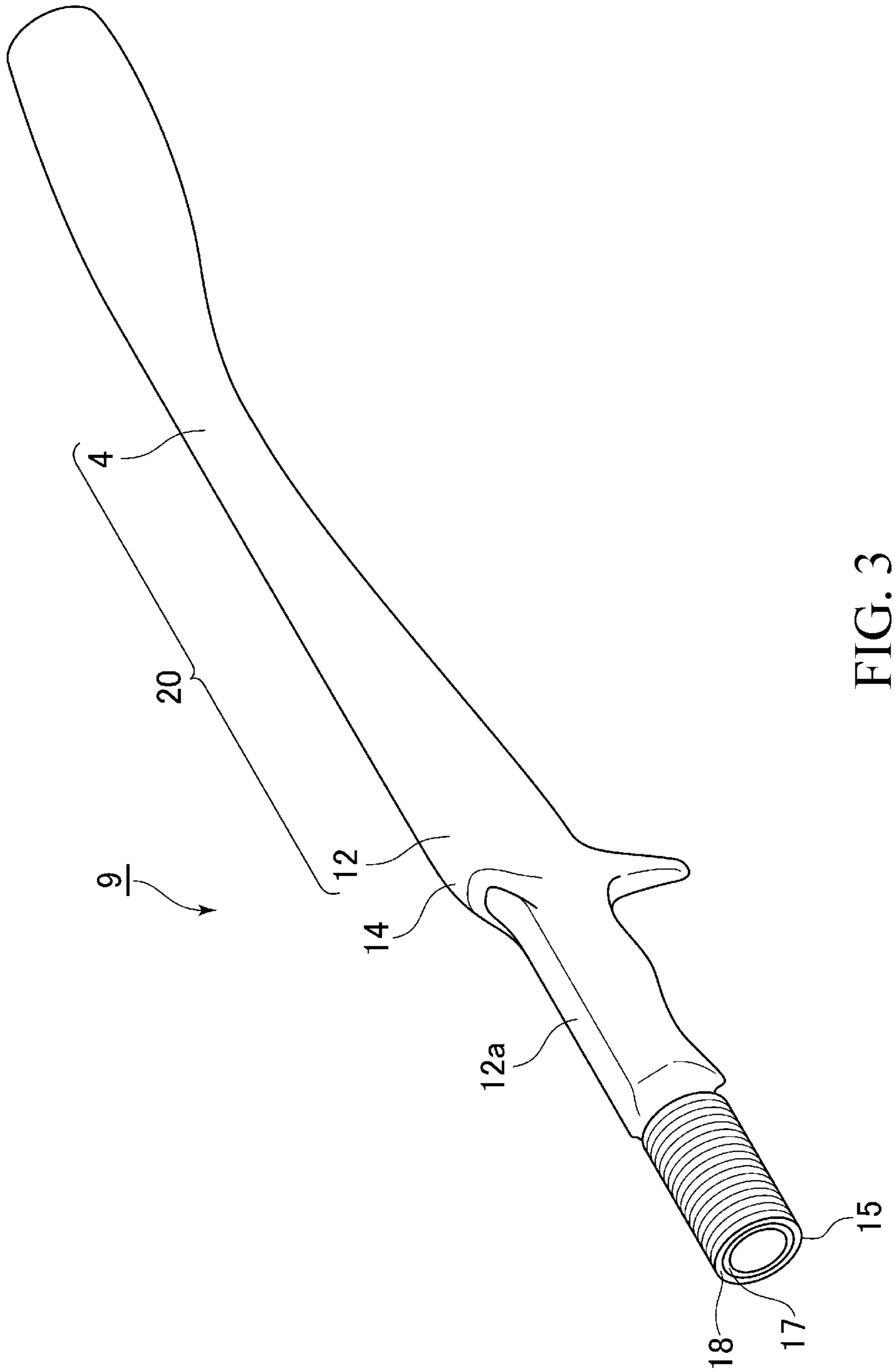
FIG. 3 is a view illustrating a fishing rod handle member according to the embodiment of the present disclosure.

Next, a fishing rod handle member 20 according to the embodiment of the present disclosure will be described with reference to FIG. 3 (and FIG. 2). Here, the fishing rod handle member 20 comprises the reel seat main body 12 described above and a grip 4 formed adjacent to the reel seat main body 12. Note that the reel seat 9 and grip 4 described above can also be collectively referred to as the fishing rod handle member 20, definition will be made as above in the present embodiment.

As illustrated in the drawing, in the fishing rod handle member 20 according to the embodiment of the present disclosure, the reel seat main body 12 having the reel leg placement portion 12*a* on which a reel leg 6*b* is placed, the grip 4 connected to the reel seat main body 12 are integrally molded, the outer layer 18 of the fishing rod handle member is formed of carbon fiber reinforced plastic, and the inner layer 17 of the fishing rod handle member is formed of resin. Furthermore, the fishing rod handle member 20 according to the embodiment of the present disclosure is formed in a hollow shape.

Here, the outer layer 18 can be formed of CFRP or CFRTP, but the present disclosure is not limited thereto. Furthermore, the inner layer 17 can be formed of ABS, acryl, PEI, or nylon, but the present disclosure is not limited thereto. As the resin used for the inner layer 17, a resin having good affinity with the resin contained in the outer layer 18 can be appropriately selected and used. In this manner, adhesion and adhesiveness between the outer layer 18 and the inner layer 17 can be improved.

In the fishing rod handle member 20 according to the embodiment of the present disclosure, it is possible to provide a fishing rod handle member comprising the reel seat that has high inner surface processability and in which the absence of resin and the fiber fuzz on the inner surface are less likely to occur.

Next, the fishing rod handle member 20 according to the embodiment of the present disclosure will be described with reference to FIGS. 4*a* and 4*b*. As illustrated in the drawings, in the fishing rod handle member 20 according to the embodiment of the present disclosure, the fishing rod handle member is formed in a hollow shape. Thus, it is possible to significantly reduce the weight without affecting the sensitivity given to the fishing rod.

In the fishing rod handle member 20 according to the embodiment of the present disclosure, the fishing rod handle member 20 is made of carbon fiber reinforced plastic (CFRP). Furthermore, as described above, the outer layer 18 of the fishing rod handle member 20 may be made of CFRTP (continuous fiber), CFRTP (discontinuous fiber), or a hybrid thereof. Since the fishing rod handle member 20 is made of such a material, it is possible to suppress an increase in weight while ensuring sufficient rigidity and strength as the handle member 20 used for the fishing rod. Furthermore, a resin material can be used for the inner layer 17 inside the outer layer 18 of the fishing rod handle member 20. In this manner, it is possible to form the fishing rod handle member comprising the reel seat that has high inner surface processability and in which the absence of resin and the fiber fuzz on the inner surface are less likely to occur.

More specifically, in the case of only the outer layer 18, when the handle member contains less resin due to variations in molding according to the core member, molding conditions, and the like to be described later, physical properties related to strength deteriorate. For example, the crushing strength of the annular portion is reduced, or the grip is easily bent. Since the inner layer 17 is present inside the outer layer 18, the resin necessary for fibers can be supplied, and thus physical properties can be stabilized (the lower limit of strength can be guaranteed).

Furthermore, in a case where a component is inserted into or bonded to the inner layer 17, it may be necessary to perform additional processing on the inner diameter according to the dimension of the component, but there is a problem that a processing allowance cannot be secured when the inner side is fuzzy. However, as in the present disclosure, since the processing allowance can be sufficiently secured due to the presence of the inner layer 17 inside the outer layer 18, it is possible to mold the handle member having a more flexible and stronger structure.

Figure 4A:
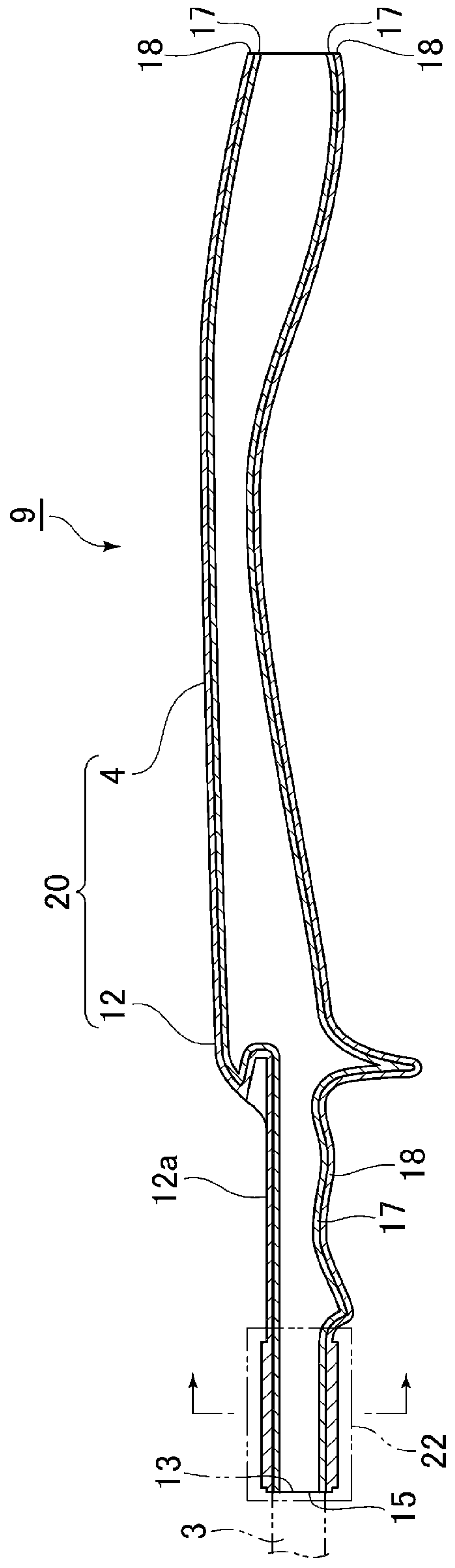
FIG. 4(*a*) is a view illustrating a fishing rod handle member according to the embodiment of the present disclosure, and FIG. 4(*b*) is a cross-sectional view of the fishing rod handle member according to the embodiment of the present disclosure.
Figure 4B:
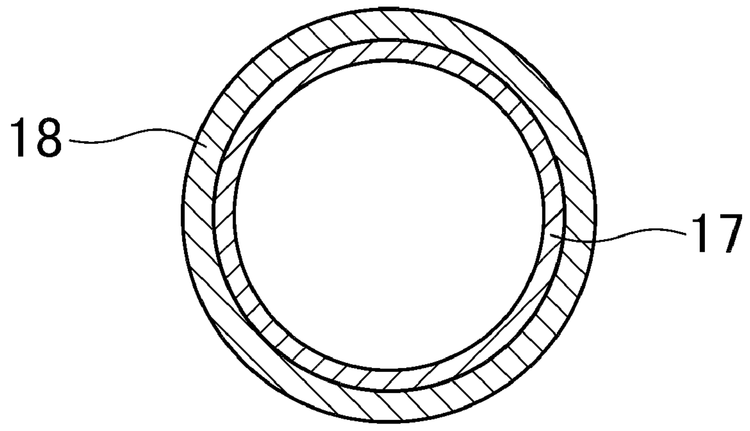

Furthermore, as illustrated in FIGS. 4*a* and 4*b*, in the fishing rod handle member 20 according to the embodiment of the present disclosure, an end 13 of the rod body 3 for a fishing rod is attached to one end 15 of the reel seat main body 12 on an opposite side of the grip 4. In this manner, unlike many methods of the related art, it is not necessary to cause the rod body to pass through the entire or substantially the entire fishing rod handle member 20. Therefore, the weight can be significantly reduced.

In the fishing rod handle member 20 according to the embodiment of the present disclosure, the end 15 of the reel seat main body 12 has a length (A) of 20 mm to 50 mm. In this manner, as described above, it is not necessary to cause the rod body to pass through the entire or substantially the entire fishing rod handle member 20. Therefore, the weight can be significantly reduced.

Here, as a method for attaching the end 13 of the rod body 3 for a fishing rod to the fishing rod handle member 20, for example, fitting (press-fitting), bonding, or fastening is conceivable, but the method is not limited thereto. The attachment methods described above have an advantage that attachment and detachment between the rod body and the handle member is easier.

Next, the fishing rod handle member 20 according to the embodiment of the present disclosure will be described with reference to FIG. 5. As illustrated in the drawings, in the fishing rod handle member 20 according to the embodiment of the present disclosure, the fishing rod handle member is formed in a hollow shape, but the fishing rod handle member 20 may include a circumferential rib in an area in which the end 13 of the rod body 3 for a fishing rod is attached to the one end 15 of the reel seat main body 12 on the opposite side of the grip 4. In this manner, it is possible to significantly reduce the weight without affecting sensitivity given to the fishing rod and to enhance rigidity (crushing rigidity) in a circumferential direction.

The fishing rod 1 according to the embodiment of the present disclosure comprises any one of the fishing rod handle member 20 and the rod body 3. In the fishing rod 1 according to the embodiment of the present disclosure, it is possible to provide a fishing rod that has high inner surface processability and in which the absence of resin and the fiber fuzz on the inner surface are less likely to occur.

The fishing rod reel seat main body 12 according to the embodiment of the present disclosure having on end attached to the rod body 3 for a fishing rod and the other end attached to the fishing rod grip 4 comprises the reel leg placing portion 12*a* on which the reel leg 6*a* is placed, the fishing reel seat main body 12 being integrally molded with the reel leg placing portion 12*a* as a whole. The outer layer 18 of the fishing rod reel seat main body 12 is formed of carbon fiber reinforced plastic and the inner layer 17 of the fishing rod reel seat main body 12 is formed of the resin. Furthermore, the reel seat main body 12 according to the embodiment of the present disclosure is formed in a hollow shape.

In the fishing rod reel seat main body 12 according to the embodiment of the present disclosure, it is possible to provide a reel seat main body 12 that has high inner surface processability and in which the absence of resin and the fiber fuzz on the inner surface are less likely to occur.

In the fishing rod handle member 20 according to the embodiment of the present disclosure, carbon fibers formed of the carbon fiber reinforced plastic (CFRP) are continuously formed in a longitudinal direction of the fishing rod handle member. In this manner, it is possible to reduce the weight by securing flexural rigidity and allow the vibration of the rod due to the fish bite to be transmitted to the hand in a sensitive manner.

Figure 5A:
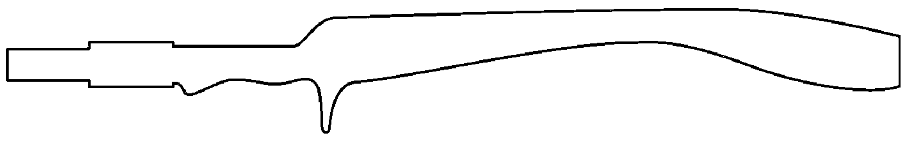
FIG. 5 is a view illustrating a method for molding a fishing rod handle member according to the embodiment of the present disclosure.

Next, a method of molding the fishing rod handle member 20 according to the embodiment of the present disclosure will be described with reference to FIG. 5. First, as illustrated in FIG. 5*a*, the shape and dimension of a core member are determined in accordance with the shape and dimension of the fishing rod handle member 20 (for example, the core member is offset inward from the fishing rod handle member 20 by about 0.5 mm to 1 mm) and a meltable core member is formed (formation of the core member). Examples of the method for forming the core member include injection molding, cast molding, and formation with a 3D printer, but are not limited thereto. The surface layer of the core member is covered with an unmeltable resin.

Figure 5B:
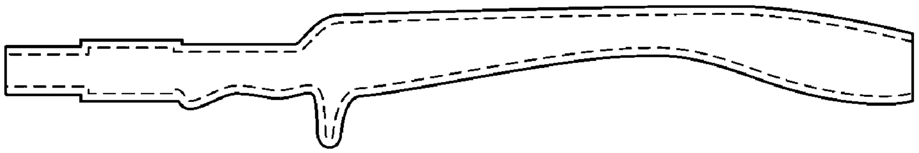

Next, as illustrated in FIG. 5*b*, a prepreg is laminated around the core member to form a preform. Here, as a material to be laminated, a dry carbon fiber base material not impregnated with the resin may be used.

Figure 5C:
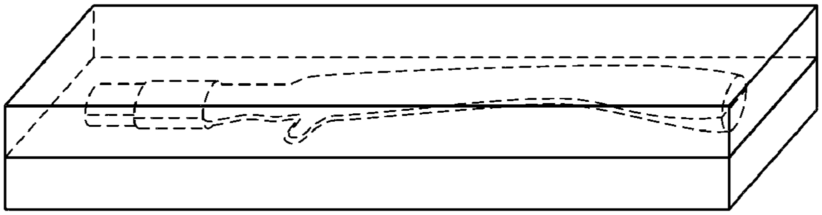

Then, as illustrated in FIG. 5*c*, the preform is placed in a mold and heated and pressurized for press molding. Note that autoclaving, RTM, or the like may be used, but the process is not limited to specific aspects.

Figure 5D:
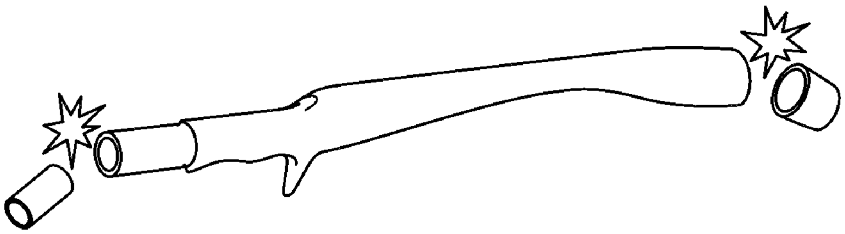

Next, as illustrated in FIG. 5*d*, secondary processing (dimensioning and deburring) is performed on the molded product. More specifically, extra portions such as a front or rear portion of the molded product and burrs generated during molding are removed.

Figure 5E:
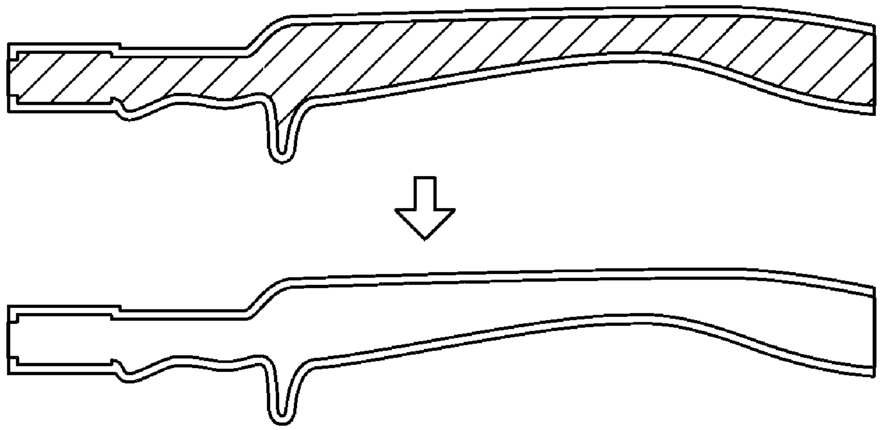
Figure 5F:
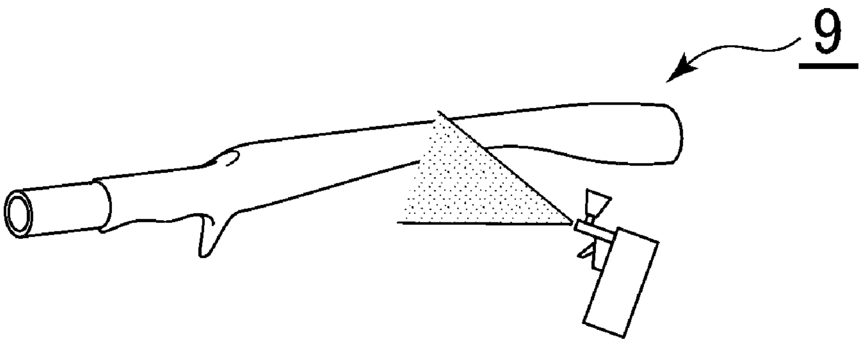
Figure 5G:
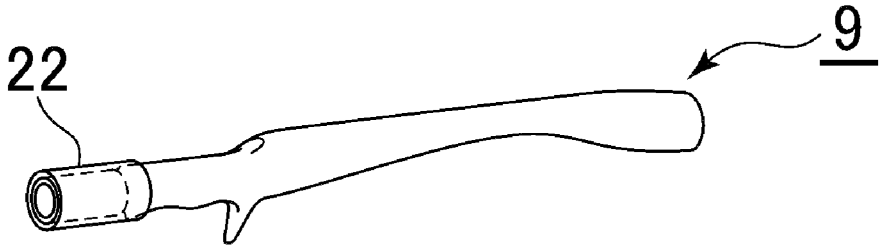
Figure 5H:
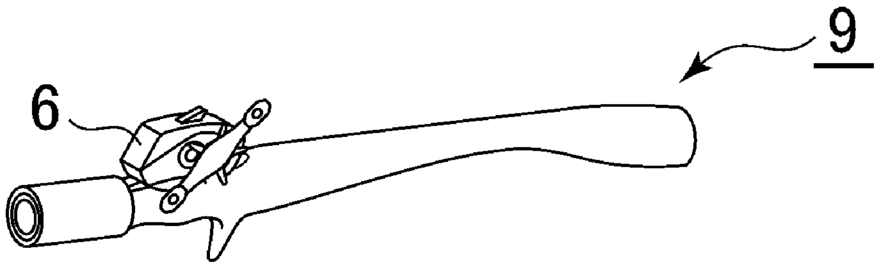

Next, as illustrated in FIG. 5*e*, the molded product subjected to the secondary processing is put in water, warm water, or the like to melt the core member inside the molded product. In this manner, the fishing rod handle member 20 is formed. Thereafter, as illustrated in FIG. 5*f*, coating or printing is appropriately performed on the outer surface of the fishing rod handle member 20. Then, as illustrated in FIG. 5*g*, components and the like for attaching the reel are attached. Finally, as illustrated in FIG. 5*h*, the reel can be placed and fixed to the fishing rod handle member 20.

In this manner, the fishing rod handle member 20 according to the embodiment of the present disclosure, that is, the fishing rod handle member 20, in which the reel seat main body 12 having the reel leg placement portion 12*a* on which the reel leg 6*a* is placed, and the grip 4 connected to the reel seat main body 12 are integrally molded, the outer layer 18 of the fishing rod handle member is formed of carbon fiber reinforced plastic, and the inner layer 17 of the fishing rod handle member is formed of the resin, is formed. Here, the inner layer 17 is formed by causing an unmeltable resin formed on the surface layer of the core member to adhere to the outer layer 18.

In the fishing rod handle member 20 formed in this manner according to the embodiment of the present disclosure, it is possible to provide a fishing rod handle member comprising the reel seat that high inner surface processability and in which the absence of resin and the fiber fuzz on the inner surface are less likely to occur.

Dimensions, materials, and arrangements of the components described in this specification are not limited to those explicitly described in the embodiment, and the components may be modified to have any dimensions, materials, and arrangements that may fall within the scope of the present disclosure. Furthermore, components not explicitly described herein can be added to the described embodiments, or some of the components described in each embodiment can be omitted.

REFERENCE SIGNS LIST

1 Fishing rod
2 Rod body
3 Base rod
4 Grip
5 Middle rod
6 Reel
6*a* Reel leg
7 Tip rod
9 Reel seat
10 Fishing line guide
12 Reel seat main body
12*a* Reel leg placing surface
13 End
14 Fixing hood
15 End
17 Inner layer
18 Outer layer
20 Fishing rod handle member
22 Moving hood

The invention claimed is:

1. A fishing rod handle member made by integrally molding a reel seat main body having a reel leg placing portion on which a reel leg is placed and a grip, wherein the fishing rod handle member comprises an inner layer and an outer layer, and is hollow-shaped with a cavity that is defined by an inner surface of the inner layer, the outer layer of the fishing rod handle member is formed of carbon fiber reinforced plastic, the inner layer of the fishing rod handle member is formed of resin without reinforced fibers, the resin of the inner layer is separately formed from the outer layer and adhered to the outer layer, and an end of a rod body for a fishing rod is attached to one end of the reel seat main body on an opposite side from the grip so that the cavity is not filled by the rod body.

2. The fishing rod handle member according to claim 1, wherein carbon fibers formed of the carbon fiber reinforced plastic are continuously formed in a longitudinal direction of the fishing rod handle member.

3. A fishing rod comprising: the fishing rod handle member according to claim 1; and the rod body.

4. A fishing rod reel seat main body comprising:

one end configured to be attached to a rod body for a fishing rod, another end attached to a fishing rod grip, and a reel leg placing portion configured to have a reel leg placed on the reel leg placing portion, wherein the fishing rod reel seat main body is integrally molded with the reel leg placing portion and the fishing rod grip, the fishing rod reel seat main body comprises an inner layer and an outer layer, and is hollow-shaped with a cavity that is defined by an inner surface of the inner layer, the outer layer of the fishing rod reel seat main body is formed of carbon fiber reinforced plastic, the inner layer of the fishing rod reel seat main body is formed of resin without reinforced fibers, the resin of the inner layer is separately formed from the outer layer and adhered to the outer layer, and the fishing rod reel seat main body is configured so that an end of the rod body for the fishing rod is attached to one end of the reel seat main body on an opposite side from the fishing rod grip so that the cavity is not filled by the rod body.

* * * * *